(12) United States Patent
Hall

(10) Patent No.: US 9,733,953 B2
(45) Date of Patent: Aug. 15, 2017

(54) API REDIRECTION FOR LIMITED CAPABILITY OPERATING SYSTEMS

(75) Inventor: Michael Hall, Snohomish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 10 days.

(21) Appl. No.: 13/531,116

(22) Filed: Jun. 22, 2012

(65) Prior Publication Data

US 2013/0347009 A1   Dec. 26, 2013

(51) Int. Cl.
G06F 9/44 (2006.01)

(52) U.S. Cl.
CPC .................. *G06F 9/4423* (2013.01)

(58) Field of Classification Search
CPC . G06F 9/54; G06F 21/53; G06F 21/42; G06F 21/51; G06F 21/57; G06F 21/78; G06F 9/44; G06F 9/4406; G06F 3/038; G06F 3/0601
See application file for complete search history.

(56) References Cited

U.S. PATENT DOCUMENTS

| | | | |
|---|---|---|---|
| 5,537,548 A | 7/1996 | Fin et al. | |
| 7,505,995 B2 | 3/2009 | Grealish et al. | |
| 7,752,601 B1 | 7/2010 | York | |
| 7,783,727 B1 | 8/2010 | Foley et al. | |
| 7,830,388 B1 | 11/2010 | Lu | |
| 8,069,487 B2 | 11/2011 | Fanton et al. | |
| 8,539,515 B1* | 9/2013 | Protassov et al. | 719/321 |
| 2002/0082717 A1* | 6/2002 | Hellberg et al. | 700/3 |
| 2002/0120696 A1* | 8/2002 | Mousseau | G06F 17/30578 709/206 |
| 2002/0154214 A1* | 10/2002 | Scallie et al. | 348/51 |

(Continued)

FOREIGN PATENT DOCUMENTS

| | | |
|---|---|---|
| CN | 102270152 A | 12/2011 |
| CN | 102473162 A | 5/2012 |

OTHER PUBLICATIONS

"API Interception via DLL Redirection", Published on: Nov. 20, 2010, Available at: http://www.ic0de.org/archive/index.php/t-9939.html.

(Continued)

*Primary Examiner* — Tuan Dao
(74) *Attorney, Agent, or Firm* — Wade IP Law LLC

(57) ABSTRACT

Systems, methods and computer program products for facilitating the execution of application programs on computing devices with limited-capability operating systems by dynamically redirecting certain API calls are disclosed. Such systems, methods and computer program products provide one or more API intercept layers and a rules engine that facilitates the ability to make dynamic decisions on how to handle specific API calls. The redirection may be initiated for any number of reasons/factors/characteristics related to the computing device that render the operating system to be considered "limited capability," such as, for example, lack of local API implementation, power level, location, central processor unit usage, and any other pattern which determines that redirecting an API call to another entity is more efficient. Such entity may be a hardware component, a partitioned or virtualized operating system image, a network-based image or a cloud-based service.

20 Claims, 7 Drawing Sheets

(56) References Cited

U.S. PATENT DOCUMENTS

| | | | |
|---|---|---|---|
| 2003/0061279 A1 | 3/2003 | Llewellyn et al. | |
| 2004/0237071 A1* | 11/2004 | Hollander et al. | 717/124 |
| 2005/0021762 A1* | 1/2005 | Gbadegesin | 709/227 |
| 2005/0160414 A1 | 7/2005 | Parnanen et al. | |
| 2006/0265714 A1 | 11/2006 | Bissett et al. | |
| 2006/0291433 A1* | 12/2006 | Do | H04L 29/06 370/338 |
| 2007/0226807 A1* | 9/2007 | Ginter | G06F 21/10 726/27 |
| 2009/0271776 A1 | 10/2009 | Schreier et al. | |
| 2009/0293057 A1* | 11/2009 | Larkin | G06F 9/468 718/1 |
| 2009/0328080 A1 | 12/2009 | Margarint et al. | |
| 2010/0064299 A1 | 3/2010 | Kacin et al. | |
| 2010/0229110 A1 | 9/2010 | Rockey et al. | |
| 2010/0242106 A1* | 9/2010 | Harris et al. | 726/15 |
| 2010/0251340 A1 | 9/2010 | Martin et al. | |
| 2010/0318665 A1* | 12/2010 | Demmer et al. | 709/227 |
| 2011/0071997 A1* | 3/2011 | Sullivan | G06F 17/30887 707/706 |
| 2011/0093941 A1 | 4/2011 | Liu et al. | |
| 2011/0131330 A1* | 6/2011 | Beaty | G06F 9/4445 709/227 |
| 2011/0145842 A1* | 6/2011 | Tofighbakhsh et al. | 719/328 |
| 2011/0173155 A1 | 7/2011 | Becchi et al. | |
| 2011/0179260 A1 | 7/2011 | Dong et al. | |
| 2011/0252318 A1 | 10/2011 | Helms | |
| 2011/0271270 A1 | 11/2011 | Bowen | |
| 2011/0307890 A1* | 12/2011 | Achilles et al. | 718/100 |
| 2012/0066760 A1* | 3/2012 | Anderson | G06F 21/6218 726/17 |
| 2013/0173894 A1* | 7/2013 | Yan | G06F 9/3885 712/228 |

OTHER PUBLICATIONS

"International Search Report & Written Opinion for PCT Patent Application No. PCT/US2013/046207", Mailed Date: Dec. 10, 2013, Filed Date: Jun. 18, 2013, 8 Pages.

"International Search Report & Written Opinion for PCT Patent Application No. PCT/US2013/047218", Mailed Date: Aug. 28, 2013, Filed Date: Jun. 24, 2013, 10 Pages.

"How to Add or Remove Operating System Features in Windows 7", Retrieved on: Nov. 30, 2011, Available at: http://microcentertechsupport.blogspot.com/2011/04/how-to-add-or-remove-operating-system.html, 3 pages.

"First Office Action and Search Report Issued in Chinese Patent Application No. 201380032907.X", Mailed Date: Oct. 9, 2016, 12 Pages.

* cited by examiner

API REDIRECTION FOR LIMITED CAPABILITY OPERATING SYSTEMS

CROSS REFERENCE TO RELATED APPLICATION

This application is related to co-owned, co-pending U.S. patent application Ser. No. 13/535,599, titled "Dynamic Addition and Removal of Operating System Components," filed on Jun. 28, 2012.

FIELD OF THE INVENTION

The present disclosure generally relates to computer operating systems and more particularly to systems, methods and computer program products for facilitating the execution of application programs on computing devices with limited-capability operating systems.

BACKGROUND

In today's technological environment, an operating system—the low-level software that manages the interface to a computing device's hardware, schedules tasks, allocates storage, and generally provides common services for application software executing on the computer—is commonly built and deployed with a fixed and well-defined operating system application program interface (API). That is, an operating system's API provides an interface (i.e., a set of calling conventions) by which application programs access the operating system and other services on a particular computing device (e.g., desktop, laptop, notebook, tablet computer, personal digital assistant (PDA), mobile telephone, smart telephone and the like). For example, the Windows® 7 operating system (available from Microsoft Corporation of Redmond, Wash.) provides the "Windows SDK" API which gives application developers a fixed and well-known API surface with which to develop application programs. This is also true for all other computing devices for which consumers expect to run application programs (i.e., any non-operating system software applications or "apps").

In the conventional operating system API model, the operating system provider/manufacturer ships a computing device with the entire underlying operating system API implemented within the operating system image. This is because exposing a consistent API surface to developers provides application compatibility across devices. There may be a number of situations, however, where implementing the entire API locally does not make sense due to location, power constraints or other factors. However, if the entire API is not implemented on the computing device, a run-time error will occur when an executing application program makes a specific call to an unimplemented API call.

SUMMARY

This summary is provided to introduce a selection of concepts. These concepts are further described below in the Detailed Description section. This summary is not intended to identify key features or essential features of the claimed subject matter, nor is this summary intended as an aid in determining the scope of the claimed subject matter.

Embodiments of the present disclosure meet the above-identified needs by providing systems, methods and computer program products facilitating the execution of application programs on computing devices with limited-capability operating systems ("O/S") by dynamically redirecting certain API calls.

Embodiments of the present disclosure include technologies that provide an API intercept layer and an underlying rules engine that facilitate the ability to make dynamic decisions on how to handle specific API calls. In various embodiments, the redirection may be initiated for any number of reasons/factors/characteristics related to the computing device that render the operating system to be considered "limited capability," such as, for example, lack of local API implementation (i.e., the operating system does contain or support one or more components to handle one or more API calls), current (low) power level, location, central processor unit (CPU) usage, and any other pattern which determines that redirecting an API call to another entity (e.g., hardware, partitioned or virtualized operating system image, network-based image, cloud-based service, etc.), due to regulatory and/or security constraints (e.g., medical, gaming, financial, military and like applications), hardware offload, etc. would be more efficient.

Further features and advantages of various embodiments of the present disclosure, as well as the structure and operation of various aspects of the present disclosure, are described in detail below with reference to the accompanying drawings.

BRIEF DESCRIPTION OF THE DRAWINGS

The features and advantages of the present disclosure will become more apparent from the detailed description set forth below when taken in conjunction with the drawings in which like reference numbers indicate identical or functionally similar elements.

DETAILED DESCRIPTION

Figure 1:
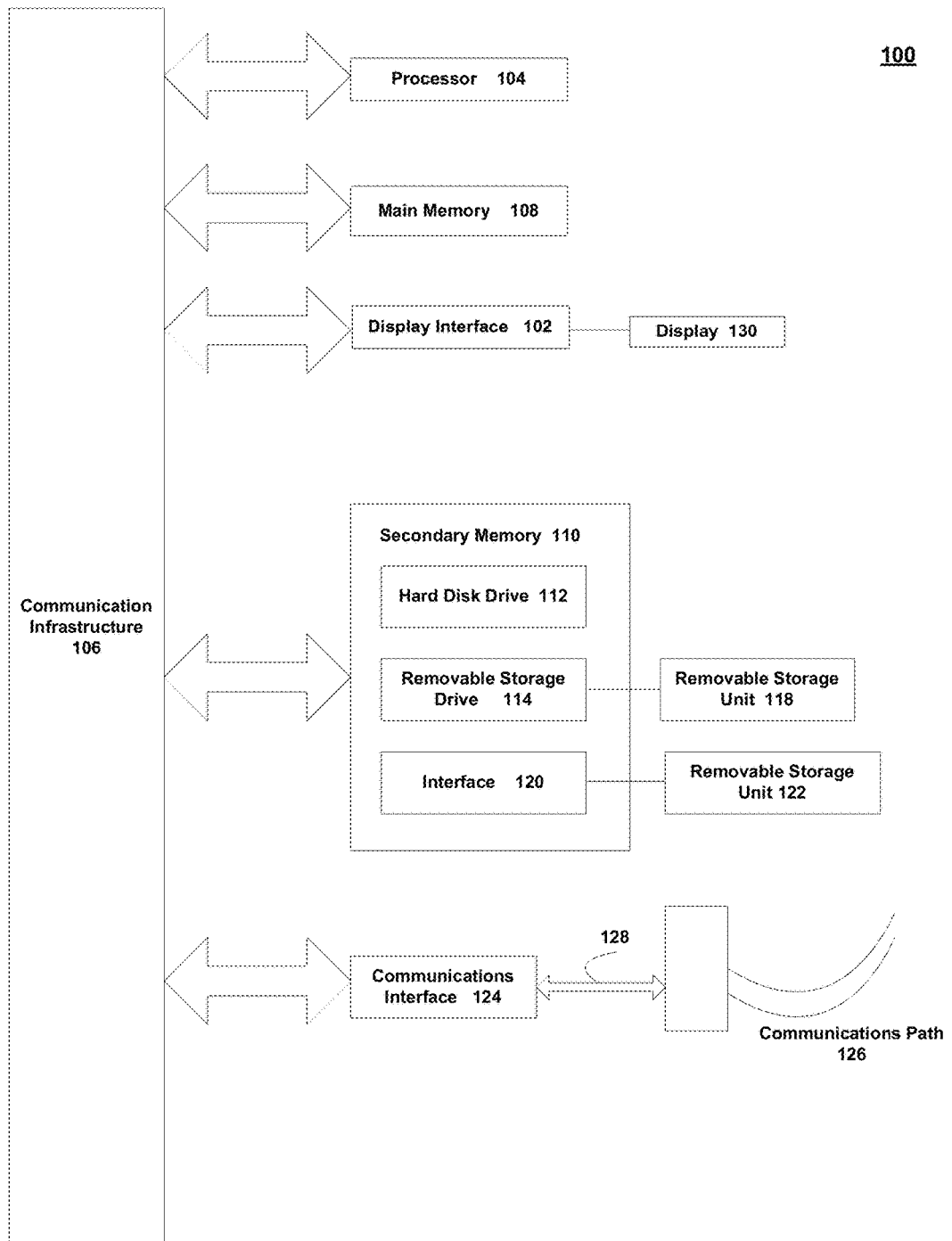
FIG. 1 is a block diagram of an exemplary computer system useful for implementing an embodiment of the present disclosure.

Embodiments of the present disclosure are directed to systems, methods and computer program products for facilitating the execution of application programs on computing devices with limited-capability operating systems by dynamically redirecting certain API calls.

In various embodiments, such systems, methods and computer program products provide an API intercept layer and an underlying rules engine that facilitate the ability to make dynamic decisions on how to handle specific, unimplemented API calls made by an executing application on a computing device.

In one embodiment, the present disclosure provides a solution based on dynamic API redirection utilizing API interception and a rules-based engine. In such an embodiment, API redirection allows an application to run in an unmodified manner by calling into a well-defined API surface which redirects calls to a graphics processing unit (GPU) (or other hardware acceleration technology) to accelerate the call. In such an embodiment, the base operating system image would include a software-based implementation of the API handler.

In another embodiment, the present disclosure provides a solution based on dynamic API redirection where an API call made by an executing application is redirected from a first computing device—where the call is unimplemented (i.e., not part of the operating system)—to another, second computing device on the same network as the first computing device to handle the API call.

In another embodiment, the present disclosure provides a dynamic API redirection solution based on a power profile. For example, a local device running on battery power may need to handle a complex, CPU-bound task/API call. Based on the current power profile, however, it may be more efficient to have such an API call handled by another computing device or cloud service (i.e., the delivery of a computing resource as a service rather than a product, whereby shared resources, software, and information are provided to computers and other devices as a metered service over a network—typically the global, public Internet).

In yet another embodiment, the present disclosure provides a dynamic API redirection solution based on the current location of the computing device. For example, it may be determined that it is more efficient for a remote computing device to handle an API call than have it handled locally. Such a determination would be based on the location of the local machine and the available networking technologies (e.g., home, airport or office network, etc.).

In yet another embodiment, the present disclosure provides a dynamic API redirection solution based on a virtualized operating system image. That is, many computing devices require secure and user-based modes (e.g., payment terminals, gaming devices and the like). The user-based section of the computing device, however, may expose API calls that should be handled by a virtualized operating system. In such an embodiment, the API appears to be local to the user operating system, but is actually redirected to a virtualized second operating system image (either executing on the same hardware or on another, more powerful computing device or cloud service).

In another embodiment, the present disclosure provides a dynamic API redirection solution based on hardware. In such an embodiment, for example, an API call may be redirected from a local USB peripheral to a virtualized or other hardware component.

In one embodiment, the present disclosure is directed toward one or more computer systems or computing devices capable of carrying out the functionality of the embodiments described herein. An example of a computer system 100 is shown in FIG. 1.

Computer system 100 includes one or more processors, such as processor 104. The processor 104 is connected to a communication infrastructure 106 (e.g., a communications bus or network). Various software aspects are described in terms of this exemplary computer system. After reading this description, it will become apparent to a person skilled in the relevant art(s) how to implement the disclosure using other computer systems and/or architectures.

Computer system 100 may include a display interface 102 that forwards graphics, text and other data from the communication infrastructure 106 (or from a frame buffer not shown) for display on the display unit 130.

Computer system 100 also includes a main memory 108, preferably random access memory (RAM) and may also include a secondary memory 110. The secondary memory 110 may include, for example, a hard disk drive 112 and/or a removable storage drive 114, representing a floppy disk drive, a magnetic tape drive, an optical disk drive, etc. The removable storage drive 114 reads from and/or writes to a removable storage unit 118 in a well-known manner. Removable storage unit 118 represents a floppy disk, magnetic tape, optical disk, etc. which is read by and written to by removable storage drive 114. As will be appreciated, the removable storage unit 118 includes a computer usable storage medium having stored therein computer software and/or data.

In alternative aspects, secondary memory 110 may include other similar devices for allowing computer programs or other code or instructions to be loaded into computer system 100. Such devices may include, for example, a removable storage unit 122 and an interface 120. Examples of such may include a program cartridge and cartridge interface (such as that found in video game devices), a removable memory chip (such as an erasable programmable read only memory (EPROM), or programmable read only memory (PROM)) and associated socket and other removable storage units 122 and interfaces 120, which allow software and data to be transferred from the removable storage unit 122 to computer system 100.

Computer system 100 may also include a communications interface 124. Communications interface 124 allows software and data to be transferred between computer system 100 and external devices. Examples of communications interface 124 may include a modem, a network interface (such as an Ethernet card), a communications port, a Personal Computer Memory Card International Association (PCMCIA) slot and card, etc. Software and data transferred via communications interface 124 are in the form of signals 128 which may be electronic, electromagnetic, optical or other signals capable of being received by communications interface 124. These signals 128 are provided to communications interface 124 via a communications path (e.g., channel) 126. This channel 126 carries signals 128 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 114, a hard disk installed in hard disk drive 112 and signals 128. These computer program products provide software to computer system 100. The disclosure is directed to such computer program products.

Computer programs (also referred to as computer control logic) are stored in main memory 108 and/or secondary memory 110. Computer programs may also be received via communications interface 124. Such computer programs, when executed, enable the computer system 100 to perform the features of the present disclosure, as discussed herein. In particular, the computer programs, when executed, enable the processor 104 to perform the features of the present disclosure. Accordingly, such computer programs represent controllers of the computer system 100.

In an embodiment where the disclosure is implemented using software, the software may be stored in a computer program product and loaded into computer system 100 using removable storage drive 114, hard drive 112 or communications interface 124. The control logic (software), when executed by the processor 104, causes the processor 104 to perform the functions of the disclosure as described herein.

In another embodiment, the disclosure is implemented primarily in hardware using, for example, hardware components such as application specific integrated circuits (ASICs). Implementation of the hardware state machine so as to perform the functions described herein will be apparent to persons skilled in the relevant art(s).

As will be apparent to one skilled in the relevant art(s) after reading the description herein, the computer architecture shown in FIG. 1 may be configured as any number of computing devices such as a game console, a portable media player, a desktop, a laptop, a server, a notebook computer, a tablet computer, a PDA, a mobile computer, a smart telephone, a mobile telephone, an intelligent communications device or the like.

In yet another embodiment, the disclosure is implemented using a combination of both hardware and software.

Figure 2:
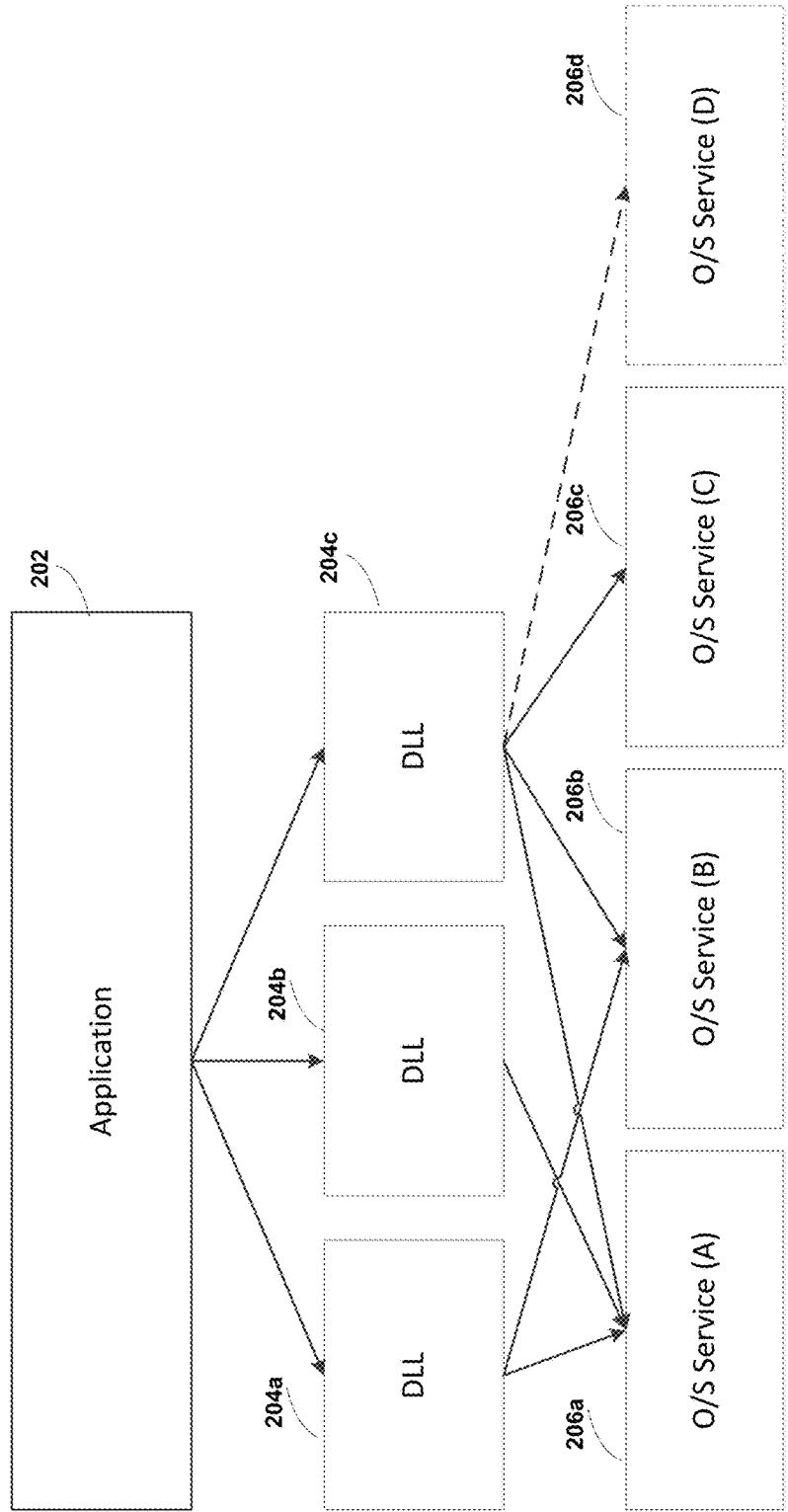
FIG. 2 is a block diagram illustrating a conventional operating system implementation environment.

Referring to FIG. 2, a block diagram is shown that illustrates an operating system implementation environment 200 utilized by many conventional computing systems. As will be appreciated by those skilled in the relevant art(s) after reading the description herein, environment 200 would exist on computing device 100 where a computer program (software) application 202 is executing.

As is well known to those skilled in the relevant art(s), as application 202 executes within environment 200, it may utilize one or more of the operating system's shared library files. In an example where computing device 100 uses the Windows® operating system available from Microsoft Corporation of Redmond Wash., such shared library files are dynamic-link library files (DLLs) (shown as DLLs 204a-c in FIG. 2). In turn, DLLs 204a-c may utilize one or more operating system components (shown as O/S Service (A)-(D) in FIG. 2) 206 as application 202 executes. As mentioned above, existing operating systems typically ship with a fixed API surface. Developers of software applications, such as application 202, rely on such a consistent API surface to enable application compatibility across different computing devices 100. However, if an operating system component (e.g., "O/S Service (D)" 206d) which normally handles a particular API call does not exist within the particular operating system implementation environment 200, the execution of application 202 will produce a run-time error and fail.

Figure 3:
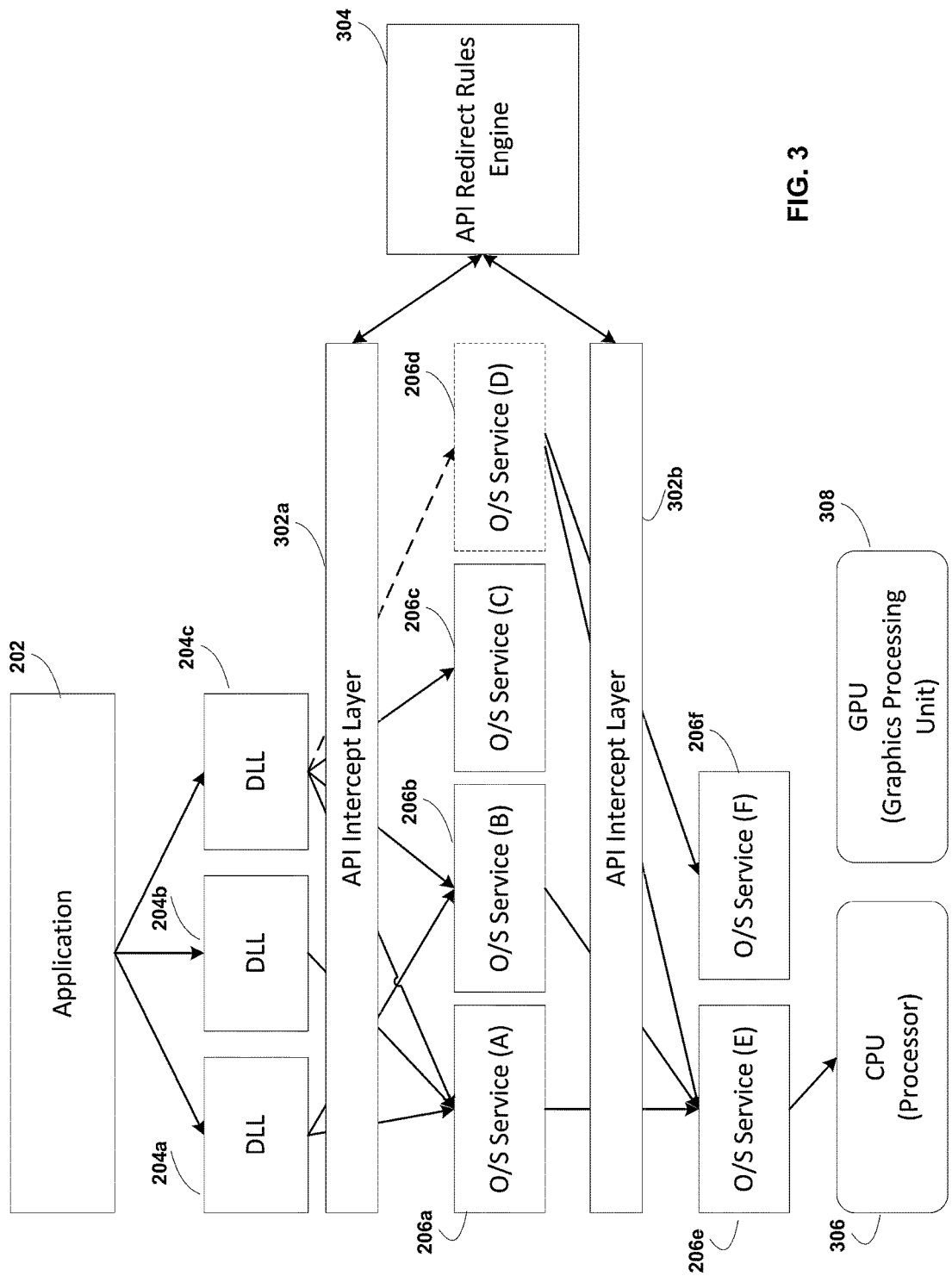
FIGS. 3-6 are block diagrams illustrating various operating system implementation environments according to embodiments of the present disclosure.

Referring now to FIG. 3, a block diagram illustrating an operating system implementation environment 300 according to an embodiment of the present disclosure is shown. In such an embodiment, the situation where application 202 produces a run-time error is overcome by environment 300 which includes an API intercept layer 302a, an API intercept layer 302b and an API redirect rules engine 304 that facilitate the ability to make dynamic decisions on how to handle specific, unimplemented operating system components necessary to handle API calls made by application 202 executing on computing device 100.

As will be appreciated by those skilled in the relevant art(s) after reading the description herein, the operating system within environment 300 may be a multi-layer operating system, where API intercept layer 302 and rules engine 304 may function at one or more of the layers to intercept an API call made by application 202 to an operating system component which does not exist within the particular operating system implementation environment 300, so as to avoid the execution of application 202 producing a run-time error and failing.

To illustrate the above point, assume application 202 executing within environment 300 makes an API call that utilizes (i.e., accesses) DLL 204c, which in turn needs to utilize operating system component 206d. The operating system of environment 300, however, has "limited capability" in that component 206d (i.e., "O/S Service (D)") is not implemented (as indicated by the dotted lines in FIG. 3). Thus, API intercept layer 302a comprises control logic to intercept API/module/feature calls and logs (i.e., stores) such "touches" (i.e., usage of API calls, services, drivers or resources) of O/S components 206. In an embodiment of the present invention, the information captured and stored by API intercept layer 302a facilitates rules engine 304 redirecting the API call made by application 202 to component 206d. The API call may then be redirected to another layer of the operating system to be handled by another entity such as operating system component 206e-f actually implemented on computing device 100. Such handling by operating system component 206e-f would involve the execution of one or more instructions by CPU 306 or GPU 308 located on computing device 100.

As will be appreciated by those skilled in the relevant art(s) after reading the description herein, in an embodiment API redirect rules engine 304 includes a table (or other data structure) of rules within the operating system environment 300 which directs API intercept layer 302 to dynamically redirect one or more API calls using one or more classes of rules shown in Table 1 that may be preset by the manufacturer of device 100 or later configured by a system administrator.

TABLE 1

| Limited Capability O/S Rule Class | Description |
| --- | --- |
| CPU Load | Offload API calls to Cloud Service |
| Hardware Acceleration | Offload API calls from CPU to GPU or other hardware acceleration technology (e.g., Java application runtime accelerators). |
| Missing API Handler | Determine whether a different set of APIs/Services can handle the calls |
| Security/Regulatory Requirements | Offload API calls to another (secure) machine (physical or virtual) |
| Speed of Connection | Offload complex/time-consuming computation to cloud service |
| Power (Battery % remaining) | Offload calls to another machine or cloud service |

As will be apparent to one skilled in the relevant art(s) after reading the description herein, API intercept layer 302 and API redirect rules engine 304 that facilitate the ability to make dynamic decisions on how to handle specific API calls may be part of the "standard" operating system that ships with a computing device 100 or may be later added to an existing operating system as part of a update (or patch).

Figure 4:
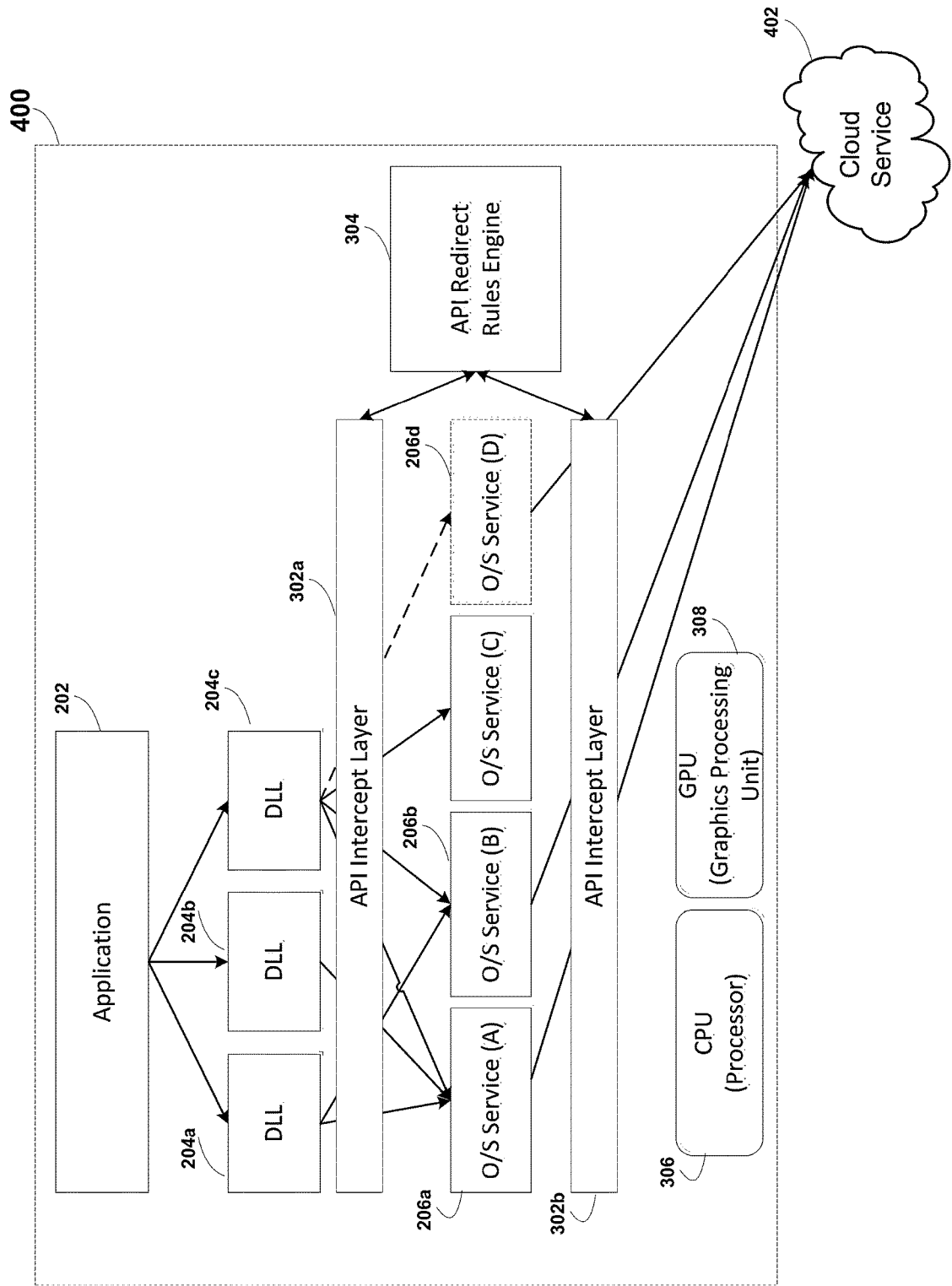

Referring now to FIG. 4, a block diagram illustrating an operating system implementation environment 400 according to an embodiment of the present disclosure is shown. Environment 400 includes API intercept layer 302a, API intercept layer 302b and API redirect rules engine 304 that facilitate the ability to make dynamic decisions regarding how to handle specific, unimplemented operating system components necessary to handle one or more API calls made by application 202 executing on computing device 100. In such an embodiment, however, API calls are redirected to a remote entity 402 (e.g., a cloud server or another device located on the same network as device 100). The decision as to where to redirect the API call is managed through rules engine 304 (based upon, for example, power levels, location, CPU usage, security and/or any other factor as explained above).

To illustrate the above point, assume application 202 executing within environment 400 utilizes DLL 204c, which in turn needs to utilize operating system component 206d. The operating system of environment 400, however, has limited capability in that component 206d (i.e., "O/S Service (D)") is not implemented (as indicated by the dotted lines in FIG. 4). Thus, API intercept layer 302a comprises control logic to intercept the API call made by application 202 to component 206d. The API call may then be redirected to another layer of the operating system by rules engine 304 utilizing information logged by API intercept layer 302b to be handled by a cloud service 402 so as to not involve the execution of one or more instructions by CPU 306 or GPU 308 located on computing device 100.

Figure 5:
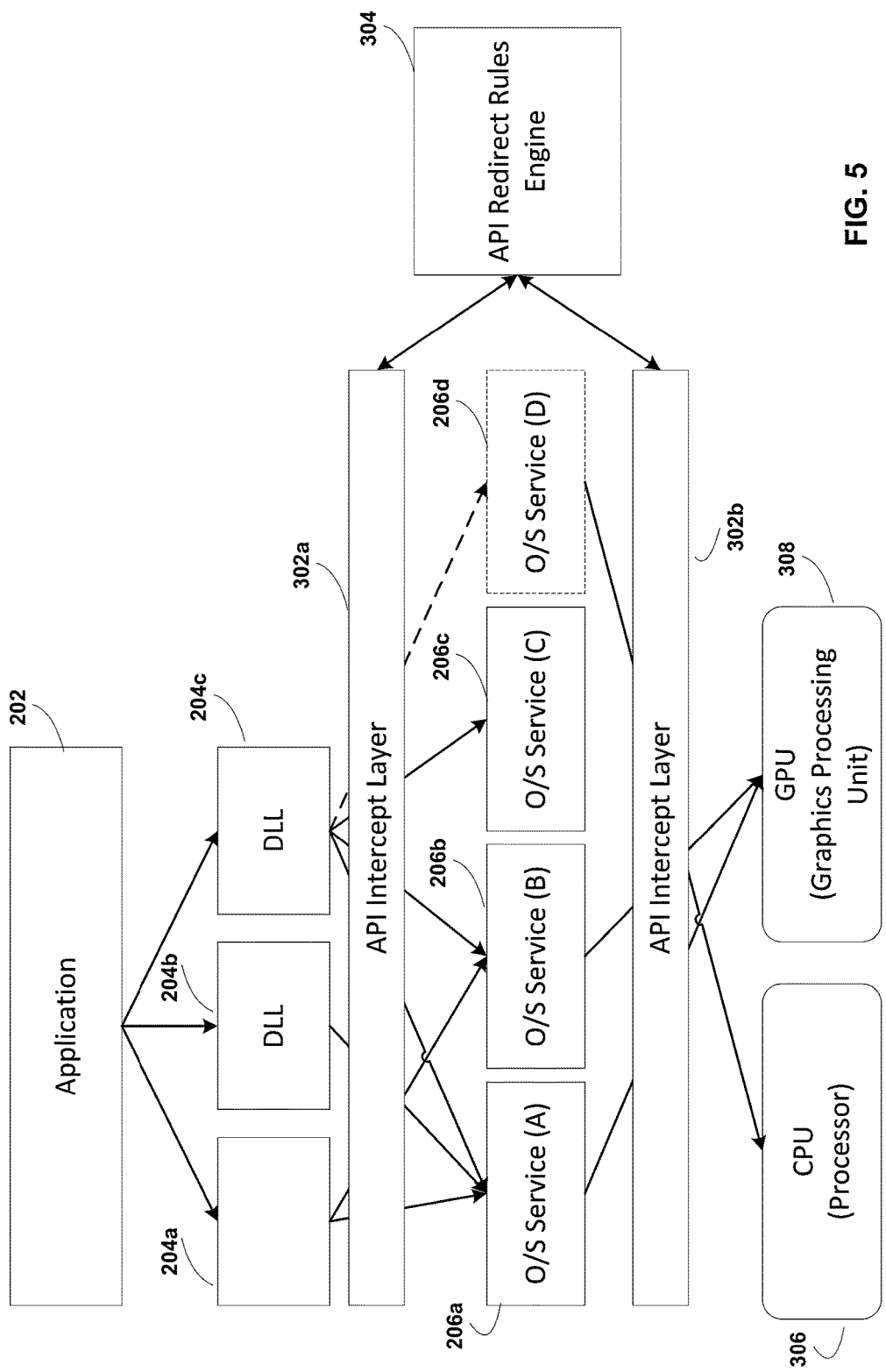

Referring now to FIG. 5, a block diagram illustrating an operating system implementation environment 500 according to an embodiment of the present disclosure is shown. Environment 500 includes API intercept layer 302a, API intercept layer 302b and API redirect rules engine 304 that facilitate the ability to make dynamic decisions on how to handle specific, unimplemented operating system components (e.g., component 206d as indicated by the dotted lines in FIG. 5) necessary to handle one or more API calls made by application 202 executing on computing device 100. In such an embodiment, however, API redirection allows application 202 to run in an unmodified manner while redirecting relevant API calls from CPU 306 to GPU 308 to accelerate the call.

To illustrate the above point, assume application 202 executing within environment 500 utilizes DLL 204a, which in turn utilizes operating system component 206a via API intercept layer 302a. API intercept layer 302b, however, under the control of engine 304, comprises control logic to intercept the instruction calls component 206a would normally make to CPU 306, and engine 304 redirects them to GPU 308. This accelerates the execution of application 202 without the code of application 202 having to be modified by a developer with knowledge that GPU 308 is present (or going to be present) on device 100.

Figure 6:
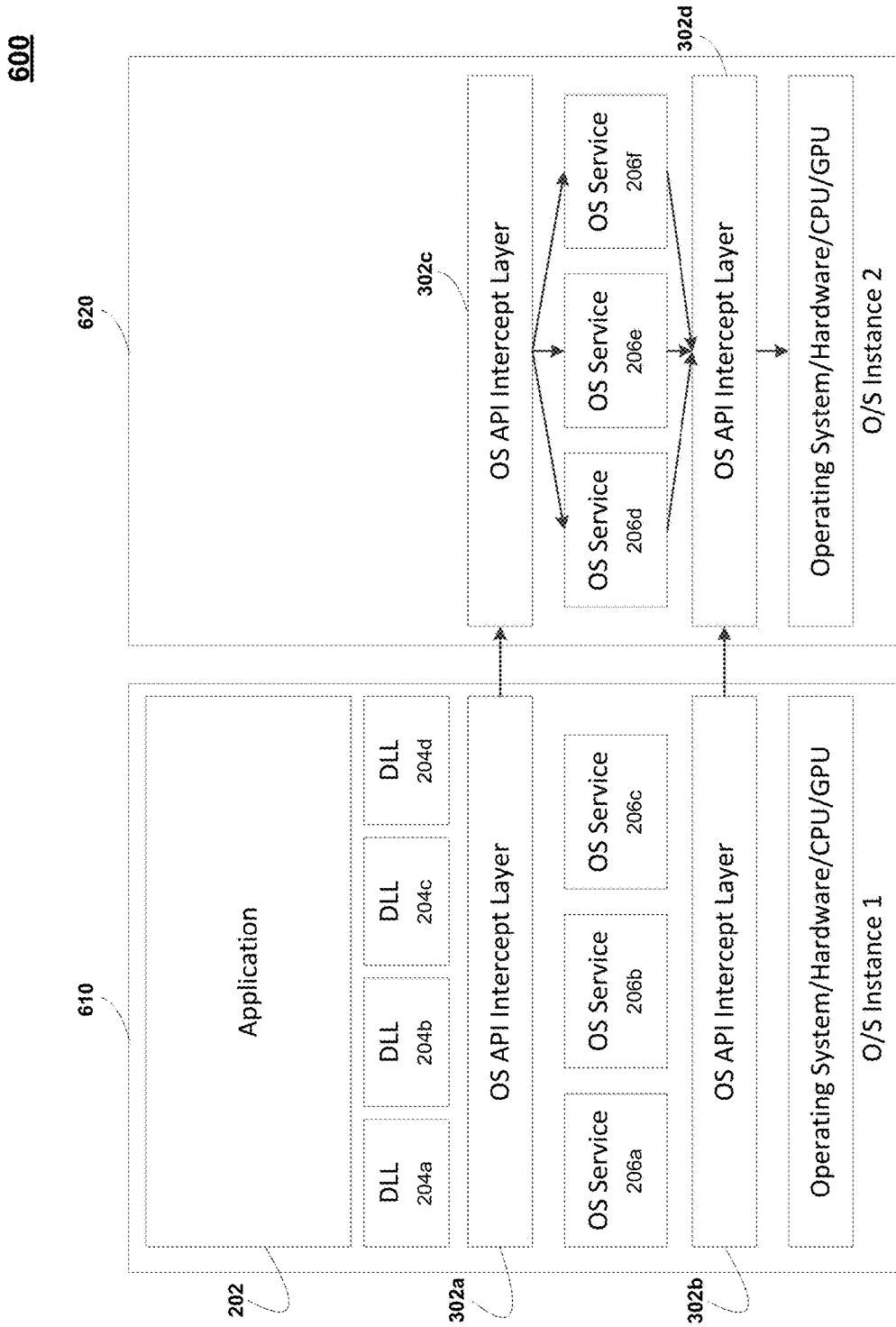

Referring now to FIG. 6, a block diagram illustrating an operating system implementation environment 600 according to an embodiment of the present disclosure is shown. In such an embodiment, computing device 100 has two operating system images (or instances) 610 and 620, which may be the same or different operating systems (e.g., Windows® desktop O/S 610 and Windows® CE O/S 620), each operating within a virtual machine. Thus, environment 600 includes API intercept layers 302a, 302b within operating system instance 610 and API intercept layers 302c, 302d within operating system image 620 and API redirect rules engine 304 that facilitate the ability to make dynamic decisions on how to handle specific, unimplemented operating system components necessary to handle one or more API calls made by application 202 executing on computing device 100.

More specifically, and by way of example, many computing devices 100 require secure and user-based modes (e.g., payment terminals, gaming devices, medical, financial or military application devices, and the like). The user-based section of computing device 100, however, may expose API calls that should be handled by a virtualized operating system running on the same device. In such an embodiment, the API call appears to be handled locally by user operating system instance 610, but is actually redirected to virtualized second operating system image 620 by redirect rules engine 304 (not shown in FIG. 6).

Figure 7:
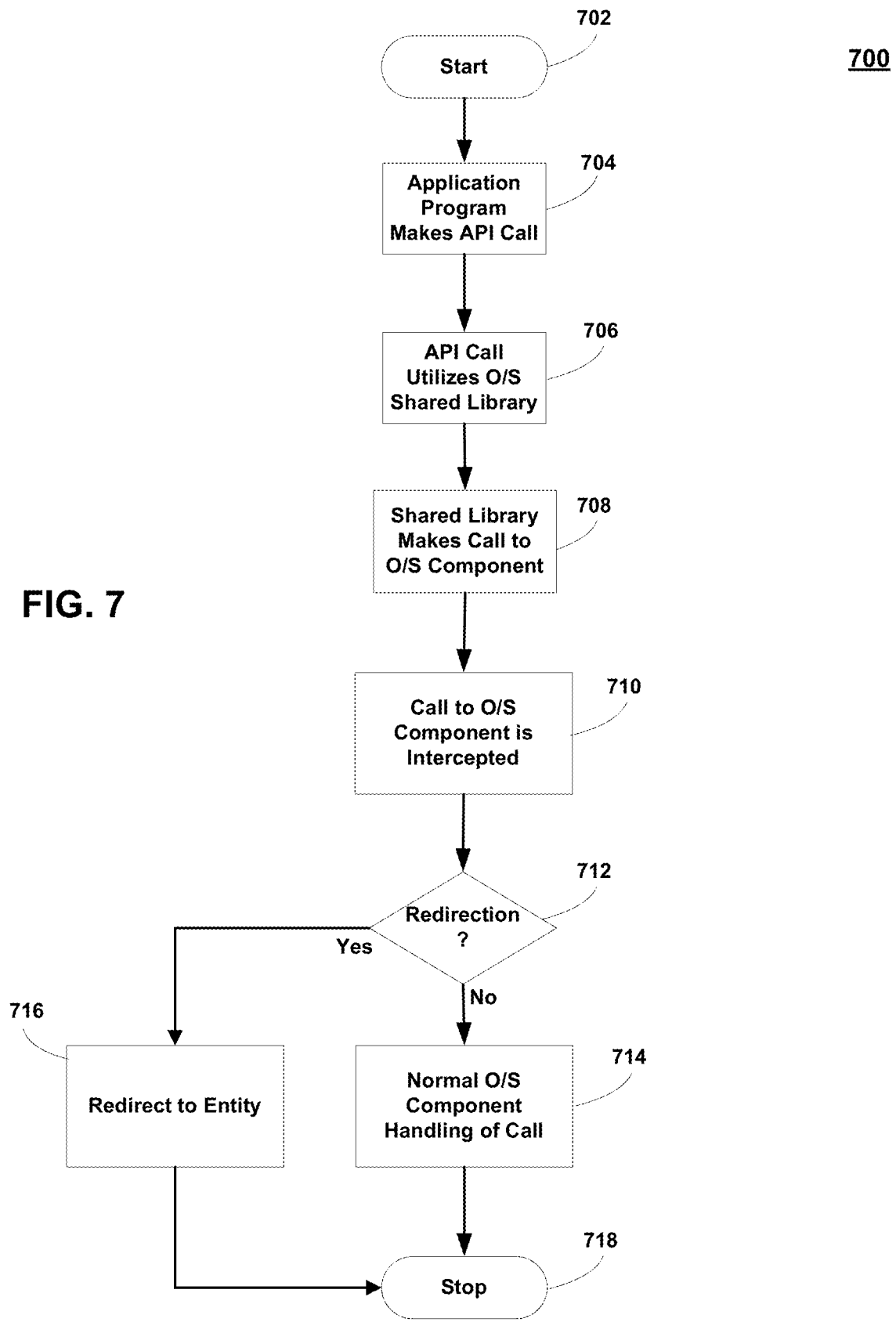
FIG. 7 is a flowchart illustrating an API redirection process according to an embodiment of the present disclosure.

Referring to FIG. 7, a flowchart illustrating an API redirection process, according to an embodiment of the present disclosure, is shown. Process 700, which would execute within computing device 100, begins at step 702 with control passing immediately to step 704.

In step 704, an application program 202 executing within environments 300, 400, 500 or 600, makes an API call.

In step 706, the API call utilizes a DLL 204, which in step 708 makes a call that is intended for an operating system component 206. In step 710, however, API intercept layer 302 intercepts the call. Then, in step 712, rules engine 304 determines if the call made by DLL 204 needs to be redirected to another entity by applying at least one redirection rule (see Table 1).

If the determination of step 712 is negative, process 700 proceeds to step 714. In step 714, the intended O/S component 206 handles the call as normal.

If the determination of step 712 is positive, however, process 700 proceeds to step 716. In step 716, the call is redirected by rules engine 304 to an entity 402 based upon one or more applicable redirection rules. Redirection may be initiated for any number of reasons/factors/characteristics related to computing device 100 that render the operating system to be considered "limited capability." Thus such rules may be, for example, based upon lack of local API implementation, power levels, location, CPU usage, security and/or any other factor as explained above (see Table 1). In various embodiments, such entity 402 may be a cloud server, a hardware component, a partitioned or virtualized operating system image, a network-based image or a cloud-based service.

Process 700, which facilitates the execution of application programs 202 on computing device 100 having a limited-capability operating system, then terminates as indicated by step 718.

While various aspects of the present disclosure have been described above, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects, but should be defined only in accordance with the following claims and their equivalents.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures (e.g., implementation within operating systems and computing devices other than those mentioned herein for illustration purposes).

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

What is claimed is:

1. A system for facilitating the execution of application programs on a computing device having a limited-capability operating system, comprising:
    a processor;
    a first application programming interface (API) intercept layer capable of intercepting an API call from an application executing on the computing device after said API call accesses a shared library file of the limited-capability operating system, said API call is intended for a component for said API call to be handled by said component for the limited-capability operating system, said component is not implemented on the computing device; and an API redirect rules engine capable of instructing said first API intercept layer to redirect said API call to an entity that is different from said component for handling by the entity and not by said component, without said instructing causing said API call to be directed to said component, based at least in part on said component not being implemented on the computing device, said rules engine applies at least one redirection rule selected from a table of redirection rules that cross-reference a plurality of reasons for redirecting API calls with a plurality of respective redirection operations that are to be performed for the plurality of respective reasons;

wherein said API redirect rules engine is configured to instruct said first API intercept layer to redirect said API call to a cloud-based service for handling by the cloud based service and not by said component based at least in part on said component not being implemented on the computing device.

2. The system of claim 1, wherein said at least one redirection rule applied by said API redirect rules engine is related to the following characteristic of the computing device:

a missing API handler.

3. The system of claim 1, wherein said first API intercept layer is configured to intercept said API call at a first layer of the limited-capability operating system;

wherein the system further comprises:
a second API intercept layer capable of intercepting said API call from said application executing on the computing device; and
wherein said second API intercept layer is configured to intercept said API call at a second layer of the limited-capability operating system.

4. The system of claim 1, wherein said API redirect rules engine is configured to not instruct said first API intercept layer to redirect said API call to said cloud-based service for handling by the cloud based service based at least in part on said component being implemented on the computing device.

5. The system of claim 1, wherein said cloud-based service does not include said component.

6. The system of claim 1, wherein said API redirect rules engine is capable of instructing said first API intercept layer to redirect said API call to said entity that does not include said component for handling by said entity and not by said component based at least in part on said component not being implemented on the computing device.

7. The system of claim 1, wherein the component is a local USB peripheral.

8. The system of claim 1, wherein said at least one redirection rule applied by said rules engine indicates that redirection is to be performed based at least in part on a remaining battery power of the computing device being relatively low.

9. A method for facilitating the execution of application programs on a computing device having a limited-capability operating system, the method executing on a processor of the computing device, comprising the steps:

intercepting, by a first application programming interface (API) intercept layer, an API call from an application executing on the computing device after said API call accesses a shared library file of the limited-capability operating system, said API call is intended for a component for said API call to be handled by said component for the limited-capability operating system, said component is not implemented on the computing device; and instructing, by an API redirect rules engine, said first API intercept layer to redirect said API call to an entity that is different from said component for handling by the entity and not by said component, without said instructing causing said API call to be received by said component, based at least in part on said component not being implemented on the computing device, said rules engine applies at least one redirection rule selected from a table of redirection rules that cross-reference a plurality of reasons for redirecting API calls with a plurality of respective redirection operations that are to be performed for the plurality of respective reasons, said instructing comprising:
instructing said first API intercept layer to redirect said API call to a cloud-based service for handling by the cloud based service and not by said component based at least in part on said component not being implemented on the computing device.

10. The method of claim 9, wherein the computing device is one of:
a payment terminal; or
a game console.

11. The method of claim 9, wherein said API call is intended for a local USB peripheral for said API call to be handled by said local USB peripheral for the limited-capability operating system, said local USB peripheral is not implemented on the computing device; and wherein instructing said first API intercept layer to redirect said API call comprises:
instructing, by said API redirect rules engine, said first API intercept layer to redirect said API call to said cloud-based service that is different from said local USB peripheral for handling by the cloud-based service and not by said local USB peripheral, without said instructing causing said API call to be received by said local USB peripheral, based at least in part on said local USB peripheral not being implemented on the computing device.

12. The method of claim 9, wherein said at least one redirection rule applied by said rules engine indicates that redirection is to be performed based at least in part on a remaining battery power of the computing device being relatively low.

13. The method of claim 9, wherein said at least one redirection rule applied by said rules engine is related to a current location of the computing device.

14. A system for facilitating the execution of application programs on a computing device having a limited-capability operating system, comprising:

a processor;
a first application programming interface (API) intercept layer capable of intercepting an API call from an application executing on the computing device after said API call accesses a shared library file of the limited-capability operating system, said API call is intended for a component for said API call to be handled by said component for the limited-capability operating system, said component is not implemented on the computing device; and an API redirect rules engine capable of instructing said first API intercept layer to redirect said API call to an entity that is different from said component for handling by the entity and not by said component, without said instructing causing said API call to be directed to said component, based at least in part on said component not being implemented on the computing device, said rules engine applies at least one redirection rule selected from a table of redirection rules that cross-reference a plurality of reasons for redirecting API calls with a plurality of respective redirection operations that are to be performed for the plurality of respective reasons, said at least one redirection rule applied by said API redirect rules engine is related to a current location of the computing device.

15. The system of claim 14, wherein said first API intercept layer is configured to intercept said API call at a first layer of the limited-capability operating system;
wherein the system further comprises:
a second API intercept layer capable of intercepting said API call from said application executing on the computing device; and
wherein said second API intercept layer is configured to intercept said API call at a second layer of the limited-capability operating system.

16. The system of claim 14, wherein said API redirect rules engine is configured to instruct said first API intercept layer to redirect said API call to a cloud-based service for handling by the cloud based service and not by said component based at least in part on said component not being implemented on the computing device.

17. The system of claim 16, wherein said API redirect rules engine is configured to not instruct said first API intercept layer to redirect said API call to said cloud-based service for handling by the cloud based service based at least in part on said component being implemented on the computing device.

18. The system of claim 17, wherein said cloud-based service does not include said component.

19. The system of claim 14, wherein said API redirect rules engine is capable of instructing said first API intercept layer to redirect said API call to said entity that does not include said component for handling by said entity and not by said component based at least in part on said component not being implemented on the computing device.

20. The system of claim 14, wherein the component is a local USB peripheral.

* * * * *